UNITED STATES PATENT OFFICE.

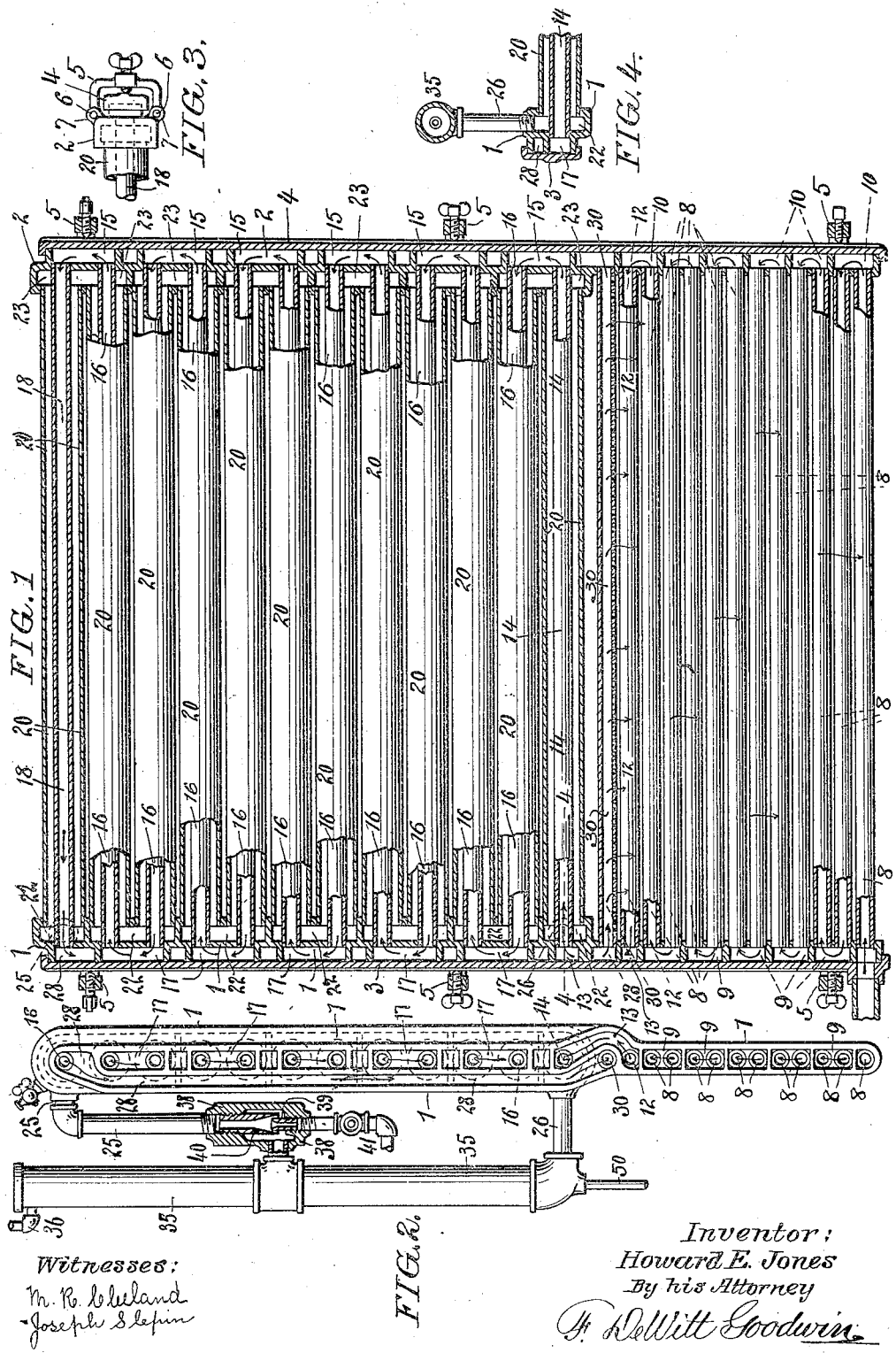

HOWARD E. JONES, OF PHILADELPHIA, PENNSYLVANIA.

MILK PASTEURIZER AND REGENERATOR.

No. 894,328.

Specification of Letters Patent.

Patented July 28, 1908.

Application filed April 23, 1908. Serial No. 428,767.

*To all whom it may concern:*

Be it known that I, HOWARD E. JONES, a citizen of the United States, residing at Philadelphia, in the county of Philadelphia and State of Pennsylvania, have invented certain new and useful Improvements in Milk Pasteurizers and Regenerators, of which the following is a specification.

My invention relates to improvements in a milk pasteurizer and regenerator, and the object of my invention is to provide means for gradually heating the milk to a high temperature without the milk having a "cooked" taste, this I accomplish by forcing the milk through a series of pipes towards the source of heat.

A further object of my invention is to utilize the hot milk, as it leaves the apparatus, for increasing the temperature of the cold milk as the latter enters. This also tends to reduce the temperature of the milk after it has been pasteurized.

In the accompanying drawings. Figure 1. is a vertical, longitudinal sectional view of my improved pasteurizer and regenerator; Fig. 2. is an end view of Fig. 1, with the end plate or cap removed; Fig. 3. is a partial plan view showing one of the fasteners for securing the end plates or caps; and, Fig. 4. is a horizontal section on line 4—4 Fig. 1.

Referring to the drawings 1 and 2 represent the end heads, each having a cap or plate 3 and 4 respectively, which said caps are tightly secured to said heads by clamps 5, said clamps are adapted to swing on removable pins 6, mounted in the lugs 7, so that said caps may be removed for the purpose of cleaning the milk pipes.

Between the heads 1 and 2 are a series of pipes 8 which connect with the chambers 9 and 10, formed in the heads 1 and 2 respectively. The said chambers 9 and 10 in the heads 1 and 2 are arranged so that the milk as it enters the apparatus through the bottom pipe 8 will be directed into the pipe next above, the milk passes through the series of pipes 8 until it passes through the pipe 12 and into the chamber 13 in the head 1. Said chamber 13 carries the milk upwards until it reaches the pipe 14. The milk passes through said pipe 14 to the chamber 15 in the head 2, which directs the milk into the next pipe 16, communicating with a chamber 17, in the head 1, and so on up through the series of pipes 16 until it reaches the pipe 18 at the top of the apparatus, as indicated by the arrows.

The pipes 14 and 18, and the intermediate pipes 16 are each inclosed in larger pipes 20 through which hot water is circulated in the opposite direction from that in which the milk flows in the pipes 14, 16 and 18. The ends of the pipes 20 are secured in the heads 1 and 2 and communicate with the chambers 22 and 23 formed in the heads 1 and 2, respectively, so that a continuous passage for the hot water is provided from the inlet pipe 25 at the top, to the outlet pipe 26, from the lowest pipe 20.

The milk after it is heated returns from the pipe 18 through the chamber 28, formed in the head 1, from which it passes into the pipe 30. Said pipe 30 is provided with perforations through which the milk is discharged and distributed over the outside of the pipe 12 and the pipes 8, for the double purpose of cooling it and for heating the milk which is entering the apparatus through the said pipes 8 and 12.

The water is heated in the following manner: a stand-pipe 35, as shown in Figs. 2 and 4, is connected with the discharge outlet 26, from one of the chambers 22 in the head 1. The said stand-pipe 35, extends above the top of the pasteurizer and is provided with an overflow pipe 36. Thus the pipes 20 are always kept filled. The water is drawn from the stand-pipe 35 into a suction T 38. Steam is forced into said suction T 38 through the reduction nozzle 39, the end of which is located adjacent the end of the sleeve 40. By this means the steam forces the water through the sleeve 40 and the inlet pipe 25, into the pipes 20, and causes the water to circulate through said pipes 20. The water is heated by the steam which enters the suction T 38, and also by the steam pipe 50 connected with the stand-pipe 35. The milk is pumped into the apparatus through the bottom pipe 8 and travels up through the pipes 8, 12, 14, 16 and 18 and is gradually heated as it ascends to the pipe 18 at the top, where the milk reaches its highest temperature, due to the fact that the hot water, as it first comes from the heater comes in contact with the top pipe 18 containing the milk. The temperature of the water is gradually reduced as it descends to the lowest one of the pipes 20. As the milk is forced in the opposite directions from the hot water it will first meet the water when the latter is at its lowest temperature so that the heating of the milk will be gradual. By discharging the hot milk over the outside of the pipes 8 and 12 through which the milk is first admitted, the temperature of the milk in the latter pipes will be raised to a high temperature before it reaches the lowest one of the hot water pipes 20. The hot milk as it leaves the perforated pipe 30 is distributed over the pipes 8 and 12 and it descends in a thin sheet. This quickly cools and aerates the milk.

By my invention the milk is quickly heated to any desired temperature and said heating will be gradual, which will prevent the milk from having a "cooked" taste after it has been pasteurized. The live steam never comes in contact with the milk pipes so that the milk cannot burn or scorch.

In place of having the pipes 16 and 20 in the pasteurizer arranged in a vertical line, as shown, they may be placed in any other position without departing from my invention as only the cooling pipes 8, 12 and 30 are required to be one above the other, where the milk descends by gravity and I do not wish to limit my invention to the present method of heating and circulating the water as any other suitable form may be used.

Having thus described my invention I claim and desire to secure by Letters Patent.

1. In a device of the character described the combination of a plurality of pipes, heads having chambers formed therein to form a passageway between the ends of said pipes, means for forcing milk through said pipes, larger pipes incasing some of said first mentioned pipes, said heads having chambers formed therein to connect said larger pipes, a discharge pipe for said milk, a chamber formed in one of said heads to connect the upper milk pipe with said discharge pipe, said discharge pipe adapted to distribute the milk over a number of the pipes through which the milk first passes upon entering the device.

2. In a device of the character described the combination of pipes through which milk is forced, end heads having chambers formed therein to connect said pipes, removable caps on said heads, larger pipes incasing some of said first mentioned pipes, chambers in said heads to connect said larger pipes, inlet and outlet pipes connected with said larger pipes, a stand-pipe, means for heating the water and forcing it from said stand-pipe through said larger pipes and a discharge pipe for said milk adapted to distribute said milk over the pipes which are not incased in said larger pipes.

3. In a device of the character described, the combination of pipes through which milk is forced, means for connecting the ends of said pipes to form a continuous passageway through the same, larger pipes incasing said first mentioned pipes, means for connecting the ends of said larger pipes to form a continuous passage through said larger pipes, means for forcing a heating medium through said larger pipes, a discharge pipe, means for connecting said first mentioned pipes with said discharge pipe, a series of pipes into which the milk is first admitted, and said discharge pipe arranged to distribute the milk over said last mentioned series of pipes.

In testimony whereof I affix my signature in presence of two witnesses.

HOWARD E. JONES.

Witnesses:
JOSEPH T. TAYLOR,
M. R. CLEELAND.